United States Patent
Tokieda et al.

(10) Patent No.: US 10,459,071 B2
(45) Date of Patent: Oct. 29, 2019

(54) ORTHOGONAL SEPARATION DEVICE AND ORTHOGONAL SEPARATION METHOD

(71) Applicant: Japan Radio Co., Ltd., Tokyo (JP)

(72) Inventors: Yukinobu Tokieda, Tokyo (JP); Keiko Matsumoto, Tokyo (JP)

(73) Assignee: JAPAN RADIO CO., LTD., Tokyo (JP)

( * ) Notice: Subject to any disclaimer, the term of this patent is extended or adjusted under 35 U.S.C. 154(b) by 194 days.

(21) Appl. No.: 15/506,780

(22) PCT Filed: Aug. 26, 2015

(86) PCT No.: PCT/JP2015/074109
§ 371 (c)(1),
(2) Date: Feb. 27, 2017

(87) PCT Pub. No.: WO2016/031882
PCT Pub. Date: Mar. 3, 2016

(65) Prior Publication Data
US 2017/0254879 A1    Sep. 7, 2017

(30) Foreign Application Priority Data

Aug. 28, 2014  (JP) .................................. 2014-174382

(51) Int. Cl.
*G01S 7/35*    (2006.01)
*G01S 13/34*   (2006.01)
(Continued)

(52) U.S. Cl.
CPC ............ *G01S 7/352* (2013.01); *G01S 13/325* (2013.01); *G01S 13/343* (2013.01); *G01S 13/42* (2013.01); *G01S 2007/356* (2013.01); *H04B 7/04* (2013.01)

(58) Field of Classification Search
None
See application file for complete search history.

(56) References Cited

U.S. PATENT DOCUMENTS 4,649,395 A * 3/1987 Gellekink ............... G01S 13/42
                                                          342/149
4,670,755 A * 6/1987 Gellekink ............... G01S 13/42
                                                          342/132
(Continued)

FOREIGN PATENT DOCUMENTS

JP     2009-025159 A    2/2009
JP     2010-203965 A    3/2009
(Continued)

OTHER PUBLICATIONS

International Search Report for application PCT/JP2015/074109; form PCT/ISA/210; dated Nov. 24, 2015; Japan Patent Office; Tokyo, Japan. (Year: 2015).*

(Continued)

*Primary Examiner* — Bernarr E Gregory
(74) *Attorney, Agent, or Firm* — Nixon Peabody LLP; Jeffrey L. Costellia (57) ABSTRACT

An orthogonal separation device of the invention includes a demodulator that performs a demodulation process corresponding to each of a plural number N of antennas for each of a plural number P (=M×N) of pulse waves (R11 to R1M), . . . , (RN1 to RNM) which arrives at the plural number N of antennas by transmitting, at the same time, a plural number M of pulse waves having phases $\phi_1$ to $\phi_M$ set as different arrays of known discrete values and that generates a plural number P of demodulated signals (R'$_{11}$ to (R'$_{1M}$), . . . (R'$_{N1}$ to R'$_{NM}$), and includes a phase adjuster that adjusts difference among the phases of a plural number P of demodulated signals (R'$_{11}$ to R'$_{1M}$), . . . , (R'$_{11}$ to R'$_{NM}$) according to the arrays of known discrete values and generates a plural number P of in-phase signals (r11 to r1M), . . . , (rN1 to rNM).

7 Claims, 7 Drawing Sheets

(51) Int. Cl.
*G01S 13/32* (2006.01)
*G01S 13/42* (2006.01)
*H04B 7/04* (2017.01)
*G01S 13/00* (2006.01)

(56) References Cited

U.S. PATENT DOCUMENTS

| | | | |
|---|---|---|---|
| H548 H * | 11/1988 | Holliday | G01S 7/28 342/145 |
| 7,151,478 B1 * | 12/2006 | Adams | G01S 13/325 342/62 |
| 7,436,348 B2 * | 10/2008 | Nohmi | G01S 7/35 342/159 |
| 8,570,210 B1 * | 10/2013 | Fonder | G01S 13/02 342/25 B |
| 9,019,148 B1 * | 4/2015 | Bikhazi | G01S 13/56 342/28 |
| 2008/0143587 A1 | 6/2008 | Johnson | |
| 2009/0079617 A1 | 3/2009 | Shirakawa et al. | |
| 2010/0164784 A1 | 7/2010 | Longstaff | |
| 2010/0220001 A1 | 9/2010 | Longstaff | |
| 2011/0279669 A1 | 11/2011 | Longstaff | |
| 2012/0274499 A1 * | 11/2012 | Chang | G01S 13/325 342/107 |
| 2013/0113652 A1 | 5/2013 | Smits et al. | |

FOREIGN PATENT DOCUMENTS

| | | |
|---|---|---|
| JP | 2009-80024 A | 4/2009 |
| JP | 2010-203965 A | 9/2010 |
| JP | 2012-145332 A | 8/2012 |
| JP | 2013-088313 A | 5/2013 |

OTHER PUBLICATIONS

International Search Report to Japanese Application No. PCT/JP2015/074109 dated Nov. 24, 2015.
European Search Report (Application No. 15835246.8) dated Feb. 13, 2018.

* cited by examiner

ORTHOGONAL SEPARATION DEVICE AND ORTHOGONAL SEPARATION METHOD

CROSS-REFERENCE TO RELATED APPLICATIONS

This application is the U.S. National Phase of International Patent Application No. PCT/JP2015/074109, filed Aug. 26, 2015, which claims the benefit of Japanese Patent Application No. 2014-174382, filed Aug. 28, 2014, the contents of which are incorporated by reference herein in their entirety.

TECHNICAL FIELD

The present invention relates to an orthogonal separation device and an orthogonal separation method that separate signals arriving from each antenna of a transmission end for each antenna arranged at a reception end of a MIMO transfer system.

Priority is claimed on Japanese Patent Application No. 2014-174382 filed on Aug. 28, 2014 the content of which is incorporated herein by reference.

BACKGROUND ART

A radar device using a frequency modulated continuous wave (FMCW) system is known as an in-vehicle radar device (for example, Patent Document 1). According to this type of radar device, the speed, the distance, and the azimuth angle of a target can be measured. In recent years, a MIMO radar that uses multiple-input and multiple-output (MIMO) technology has drawn attention. According to the MIMO radar, the number of antennas can be virtually increased. Thus, what can be expected is improved resolution of an azimuth angle that is one basic capability of a radar device.

In the MIMO radar, signals respectively transmitted from a plurality of transmitting antennas on the transmission side are required to be distinguished on the reception side. A time separation system is known as one of signal distinction systems. According to the time separation system, signals are sequentially transmitted from the plurality of transmitting antennas on the transmission side by shifting time. On the reception side, signals corresponding to the transmitting antennas can be distinguished from the difference in time when reflective waves of the signals transmitted from each transmitting antenna are received.

PRIOR ART DOCUMENTS

Patent Documents

[Patent Document 1] Japanese Unexamined Patent Application, First Application No. 2009-25159

SUMMARY OF INVENTION

Problems to be Solved by the Invention

However, according to the time separation system, there is a problem in that a measurable speed is limited. That is, in the case of measuring the speed of the target, the amount of phase rotation (Doppler amount) of a reflective wave of a signal transmitted from a specific transmitting antenna is required to be obtained. In this case, the signal transmitted from the specific transmitting antenna is required to be distinguished and sampled.

According to the time separation system, as the number of transmitting antennas is increased, the time interval between signals transmitted from individual transmitting antennas is increased. In this case, the time interval of sampling of the signal received from the specific transmitting antenna is required to be increased. When the time interval of sampling is increased, the frequency of an observable received signal is decreased according to the sampling theorem. Consequently, the upper limit of a measurable speed is decreased, and it is difficult to detect a target that moves at a high speed.

The invention is conceived in view of the above matter, and an object thereof is to provide an orthogonal separation device and an orthogonal separation method that can separate pulse waves arriving through propagation paths formed for each pair of antennas arranged in plural numbers at each of the transmission and reception ends, with significant facilitation of constraints in a conventional example.

Means for Solving the Problems

An orthogonal separation device according to a first aspect of the invention includes a demodulator that performs a demodulation process corresponding to each of a plural number N of antennas for each of a plural number P(=M×N) of pulse waves (R11 to R1M), ..., (RN1 to RNM) which arrives at the plural number N of antennas by transmitting, at the same time, a plural number M of pulse waves having phases $\phi_1$ to $\phi_M$ set as different arrays of known discrete values and that generates a plural number P of demodulated signals (R'$_{11}$ to R'$_{1M}$), ..., (R'$_{N1}$ to R'$_{NM}$), and includes a phase adjuster that adjusts difference among the phases of a plural number P of demodulated signals (R'$_{11}$ to R'$_{1M}$), ..., (R'$_{N1}$ to R'$_{NM}$) according to the arrays of known discrete values and generates a plural number P of in-phase signals (r11 to r1M), ..., (rN1 to rNM). The orthogonal separation device according to the first aspect of the invention may further include an integrator that integrates each combination of in-phase signals (r11 to rN1), ..., (r1M to rNM), of the plural number P of in-phase signals (r11 to r1M), ..., (rN1 to rNM), corresponding to each pulse wave arriving at the plural number N of antennas and that acquires received waves $S_1$ to $S_N$ corresponding to the respective plural number N of antennas.

An orthogonal separation method according to a second aspect of the invention includes performing a demodulation process corresponding to each of the plural number N of antennas for each of the plural number P (=M×N) of pulse waves (R11 to R1M), ..., (RN1 to RNM) that arrives at the plural number N of antennas by transmitting, at the same time, the plural number M of pulse waves having the phases $\phi_1$ to $\phi_M$ set as different arrays of known discrete values, and generating the plural number P of demodulated signals (R'$_{11}$ to R'$_{1M}$), ..., (R'$_{N1}$ to R'$_{NM}$), and adjusting the difference among the phases of the plural number P of demodulated signals (R'$_{11}$ to R'$_{1M}$), ..., (R'$_{N1}$ to R'$_{NM}$) according to the arrays of known discrete values and generating the plural number P of in-phase signals (r11 to r1M), ..., (rN1 to rNM).

The orthogonal separation method according to the second aspect of the invention may further include integrating each combination of the in-phase signals (r11 to rN1), ..., (r1M to rNM), of the plural number P of in-phase signals (r11 to r1M), ..., (rN1 to rNM), corresponding to each pulse wave arriving at the plural number N of antennas, and acquiring received waves $S_1$ to $S_N$ corresponding to the respective plural number N of antennas.

According to the orthogonal separation device according to the first aspect and the orthogonal separation method according to the second aspect, the plural number M of pulse waves are not multiplexed on any of a frequency axis and a time axis at the transmission end of the pulse waves and are set as arrays of known discrete values having different phases $\phi_1$ to $\phi_M$. The phases are adjusted at the reception end according to the arrays of discrete values.

Each combination of the pulse waves having phases thereof adjusted is integrated. Thus, separation of pulse waves that individually arrive through M×N transfer paths formed between M antennas used in transmission of the plural number M of pulse waves and N antennas included at the reception end can be realized.

Effects of the Invention

According to the orthogonal separation device according to the first aspect and the orthogonal separation method according to the second aspect of the invention, pulse waves that are transferred through any pair of a plurality of antennas included at each of the transmission end and the reception end are accurately, stably, and inexpensively separated without being significantly affected by any of the following constraints (1) to (3), compared with a conventional example.
(1) The amount of processing of digital signal processing that may be realized for each pulse width of target pulse waves of MIMO transfer or each inverter.
(2) A decrease in the amount of information of a received wave that is acquired for each pulse width or each inverter.
(3) An increase in band that may be required for a reception hand.

EMBODIMENTS FOR CARRYING OUT THE INVENTION

Hereinafter, an embodiment of the invention will be described with reference to the drawings.

Generally, an FMCW radar device according to the embodiment is characterized as realizing orthogonal separation of signals by, on the transmission side, applying discrete phase modulation in each predetermined signal region (a "sweep" described later) where the frequency of a frequency modulated continuous wave (hereinafter, referred to as an "FMCW wave") forming a transmitted signal rises from a predetermined lower limit value to a predetermined upper limit value and, on the reception side, performing phase modulation opposite to the phase modulation of the transmission side in each signal region. That is, in the embodiment, orthogonality of a signal is not acquired by the difference between characteristics of transfer paths (space). Orthogonality of a signal is realized by a combination of phases of each signal region. Such a combination of phases of signal regions is determined for each transmitting antenna by a code generated by using a random number or the like. Each transmitting antenna is assigned a code array that is configured of codes for determining a combination of phases of the signal regions.

[Description of Configuration of Radar Device]

Figure 1:
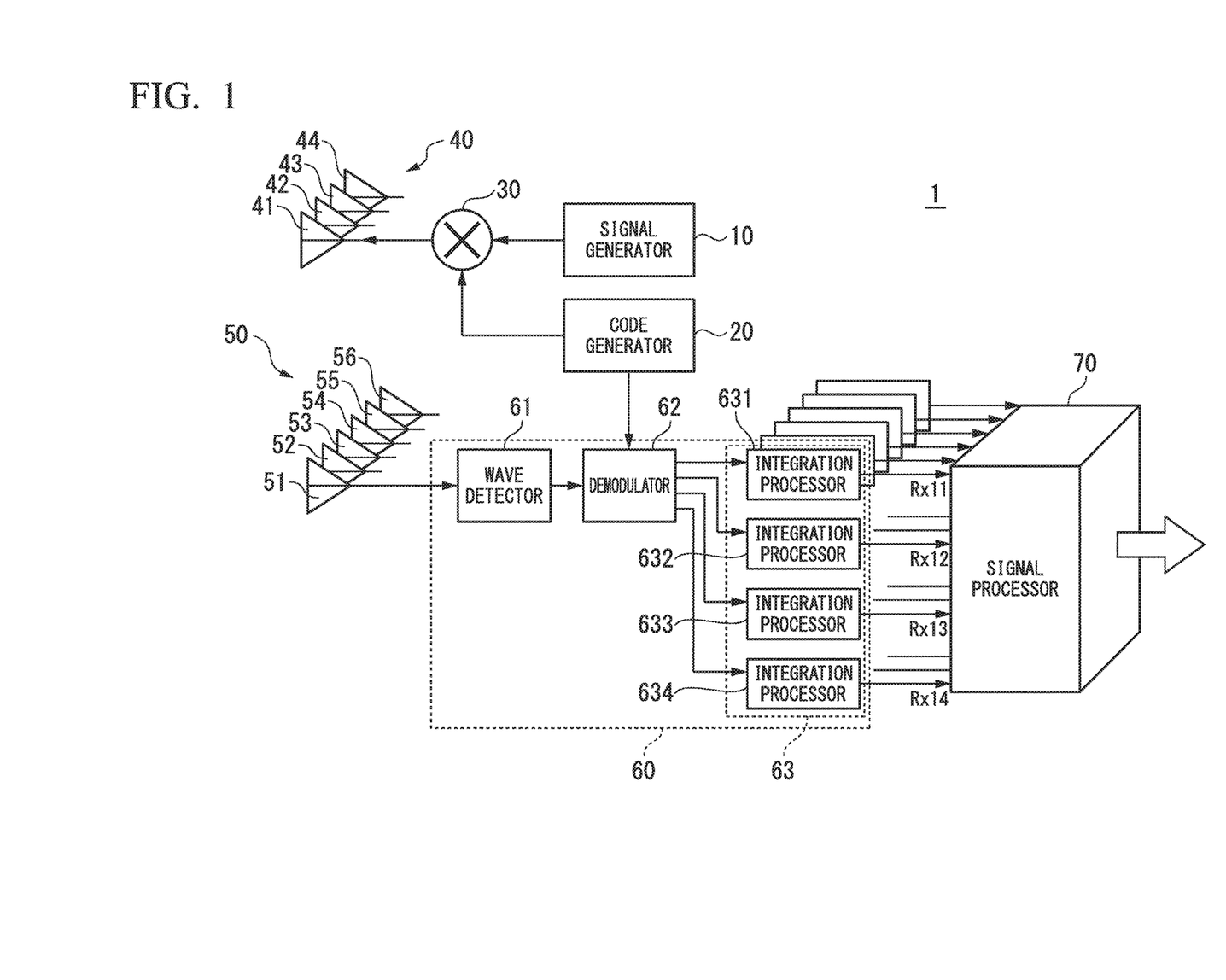
FIG. 1 is a diagram showing a configuration example of a radar device according to an embodiment of the invention.

FIG. 1 is a diagram showing a configuration example of a radar device 1 according to the embodiment of the invention.

The radar device 1 includes a signal generator 10, a code generator 20, a modulator 30, a transmitting antenna array 40, a receiving antenna array 50, a receiver 60, and a signal processor 70 and is configured as a MIMO radar using an FMCW system.

The transmitting antenna array 40 includes a plurality of transmitting antennas 41 to 44. In the embodiment, the transmitting antenna array 40 is a four-element antenna that includes the four transmitting antennas 41 to 44. The number of the plurality of transmitting antennas constituting the transmitting antenna array 40 may be arbitrarily set. The receiving antenna array 50 includes a plurality of receiving antennas 51 to 56. In the embodiment, the receiving antenna array 50 is a six-element antenna that includes the six receiving antennas 51 to 56. The number of the plurality of receiving antennas constituting the receiving antenna array 50 may be arbitrarily set.

A signal received in each of the plurality of receiving antennas 51 to 56 is a linear combination of signals respectively transmitted from the plurality of transmitting antennas 41 to 44. In the MIMO radar, signals respectively transmitted from the plurality of transmitting antennas 41 to 44 are required to be distinguished on the reception side. The radar device 1 according to the embodiment has a main feature in a technique of orthogonal separation of signals transmitted from the plurality of transmitting antennas 41 to 44.

The signal generator 10 is configured to generate a plurality of transmitted signals that is respectively transmitted from the plurality of transmitting antennas 41 to 44. The plurality of transmitted signals may be the same signal or may be different signals. In the embodiment, the signal generator 10 is configured to generate the same signal as transmitted signals respectively transmitted from the plurality of transmitting antennas 41 to 44.

A transmitted signal generated by the signal generator 10 is a signal that is configured of repetitions of an FMCW wave (a chirp) of which the frequency rises straight from a predetermined lower limit value to a predetermined upper limit value. Hereinafter, a signal region corresponding to the cycle of repetitions of the FMCW wave will be referred to as a "sweep".

The signal generator 10 not only generates the FMCW wave but also may generate any signal as a transmitted signal. For example, a transmitted signal may include a signal that is configured of repetitions of a triangle wave of which the voltage rises straight in a certain period. A transmitted signal may be a pulse signal, and the signal waveform of the pulse signal may be arbitrarily set.

The code generator 20 is configured to generate a plurality of different code arrays corresponding to the plurality of transmitting antennas 41 to 44. The code generator 20 generates a code array that includes a binary code indicating the amount of phase rotation (0° or 180°) used when the phase of a transmitted signal is modulated in the modulator 30 described later. Hereinafter, for convenience of description, the value of a code indicating an amount of phase rotation of 0° will be set to "0" and the value of a code indicating an amount of phase rotation of 180° will be set to "$\pi$".

The code generator 20 generates lour different code arrays corresponding to the four transmitting antennas 41 to 44 by using a random number. A code array generated by the code generator 20 includes a binary code of "0" or "$\pi$" like, for example, "$\pi\pi\pi\pi 0\pi\pi 0\pi$ . . . ", and the arrangement order of "0" and "$\pi$" is determined for each transmitting antenna by using a random number.

Specifically, in the embodiment, the code generator 20 is configured to generate "$\pi\pi\pi\pi 0\pi\pi 0\pi \ldots 0\pi 0\pi$" as a first code array corresponding to the transmitting antenna 41, generate "$0\pi\pi 0\pi\pi 000 \ldots \pi 0\pi 0$" as a second code array corresponding to the transmitting antenna 42, generate "$0\pi 000\pi 000 \ldots 0\pi 0\pi$" as a third code array corresponding to the transmitting antenna 43, and generate "$\pi 0\pi 0\pi\pi 0\pi\pi \ldots 0\pi\pi\pi$" as a fourth code array corresponding to the transmitting antenna 44. The total number of codes included in each code array is set to "500" in accordance with setting the number of sweeps of a transmitted signal that is a target of one reception process in the receiver 60 described later to "500".

A code array may include codes indicating only one of "0" and "$\pi$". The amounts of phase rotation indicated by a binary code constituting a code array is not limited to 0° and 180° and may be arbitrarily set like, for example, 30° and 90° provided that the amounts of phase rotations are different from each other. A code constituting a code array is not limited to a binary code and may be a ternary or higher level code provided that the code is a multivalued code.

The phase intervals among a plurality of amounts of phase rotation indicated by a multivalued code is not required to be equal. In addition to the technique of using a random number, a technique of using, for example, an M-sequence or a gold code is exemplified as a technique of setting an arrangement of codes constituting a code array. An arrangement of codes may be arbitrarily set provided that arrangements of codes are different from each other. The total number of codes constituting a code array, that is, the length of a code array, may also be arbitrarily set.

The modulator 30 is used to modulate the phase of a transmitted signal by rotating the phase of a transmitted signal generated by the signal generator 10 according to a code array generated by the code generator 20. In the embodiment, the phase of a transmitted signal is modulated by rotating the phase of a transmitted signal by just 0° (0 radian) or 180° (a radians) for each sweep.

The value of a code (0 and $\pi$) constituting a code array generated by the code generator 20 determines which one of amounts of phase rotations of 0° and 180° is applied for each sweep. In the embodiment, for example, the amount of phase rotation indicated by the value of a first code of the first code array assigned to the transmitting antenna 41 is applied for a first sweep of a transmitted signal Tx1 transmitted from the transmitting antenna 41. The amount of phase rotation indicated by the value of a second code of the same code array is applied for a second sweep. The same applies for the subsequent amount of phase rotation.

The modulator 30 supplies a transmitted signal having a phase thereof modulated to the transmitting antenna 41. While FIG. 1 representatively shows only the modulator 30 disposed for the transmitting antenna 41, the modulator 30 is also disposed for each of the other transmitting antennas 42 to 44. That is, the radar device 1 includes a plurality of the modulators 30 in correspondence with the plurality of transmitting antennas 41 to 44. While transmitted signals input from the signal generator 10 into each of the plurality of modulators 30 are the same in the embodiment as described above, it is to be noted that code arrays input from the code generator 20 to each of the plurality of modulators 30 are different from each other.

The plurality of modulators 30 corresponding to the plurality of transmitting antennas 41 to 44 may be integrated into one. It is irrelevant to the essence of the invention whether the plurality of modulators 30 corresponding to the plurality of transmitting antennas 41 to 44 are individually disposed or the plurality of modulators 30 are integrated into one. Arbitrary setting may be made according to an embodiment of the invention. If the plurality of modulators 30 corresponding to the plurality of transmitting antennas 41 to 44 is formally represented as one modulator 30, the modulator 30 is said to be configured to modulate the phases of a plurality of transmitted signals generated by the signal generator 10 according to a plurality of code arrays generated by the code generator 20 and respectively supply the plurality of transmitted signals having phases thereof modulated to the plurality of transmitting antennas 41 to 44.

The receiver 60 includes a wave detector 61, a demodulator 62, and an integrator 63. The receiver 60 which is not provided in FIG. 1 is disposed in correspondence with each of the receiving antennas 51 to 56. Hereinafter, a description will be provided with focus on the receiver 60 that is disposed in correspondence with the receiving antenna 51.

The wave detector 61 constituting the receiver 60 is used to detect the wave of a received signal that is received by the corresponding receiving antenna 51. A wave detection process of the wave detector 61 is set according to a system of a radar. The radar device 1 according to the embodiment, is a radar device using the FMCW system. Thus, the wave detector 61 performs a Fourier transform as a wave detection process. However, the invention is not limited to this example. If the radar device 1 is, for example, a radar using a pulse radar system, the wave detector 61 detects the amplitude of a wave as a wave detection process. If the radar device 1 is a radar using a pulse compression radar system, the wave detector 61 performs a pulse compression process as a wave detection process.

The demodulator 62 is used to demodulate a signal having a wave thereof detected by the wave detector 61 by performing opposite phase modulation of the signal according to the above-described plurality of code arrays (the first code array to the fourth code array). The integrator 63 is used to integrate the signal demodulated by the demodulator 62 to generate received signals Rx11, Rx12, Rx13, and Rx14 that correspond to the plurality of transmitted signals respectively transmitted from the transmitting antennas 41 to 44.

Figure 2:
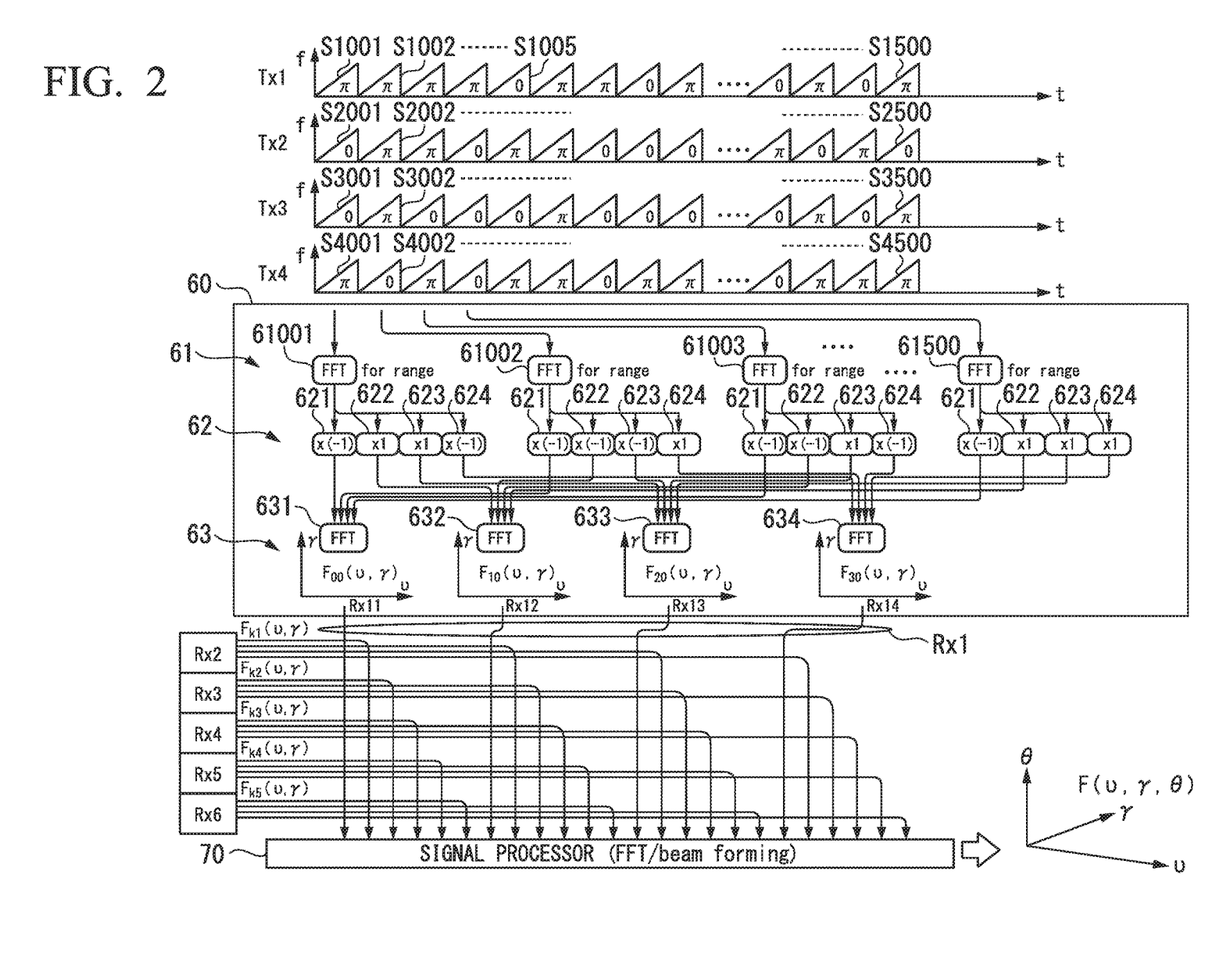
FIG. 2 is a diagram showing a detailed configuration example of a receiver of the radar device according to the embodiment of the invention and a flow of signals.

FIG. 2 is a diagram showing a detailed configuration example of the receiver 60 of the radar device 1 according to the embodiment of the invention and a flow of signals. The upper part of FIG. 2 schematically shows a waveform diagram of transmitted signals Tx1 to Tx4 received in each of the receiving antennas 51 to 56. In the waveform diagram, the horizontal axis denotes a time 1, and the vertical axis denotes a frequency of a transmitted signal. The middle part of FIG. 2 shows a detailed configuration of the receiver 60 into which a mixed signal acquired by the receiving antenna 51 receiving the transmitted signals Tx1 to Tx4 is input. The lower part of FIG. 2 shows a received signal Rx1 that is input into the signal processor 70 from the receiver 60 disposed in correspondence with the receiving antenna 51, and received signals Rx2 to Rx6 that are input into the signal processor 70 from the receivers 60 (not shown) disposed in correspondence with the receiving antennas 52 to 56.

In the embodiment, the wave detector 61 includes a plurality of wave detection processors 61001, 61002, 61003 . . . , 61500 corresponding to the number of sweeps of each transmitted signal (that is, the length of each of the above-described plurality of code arrays) that is a target of one reception process in the receiver 60. In the embodiment, the number of sweeps of each transmitted signal that is a target of one reception process in the receiver 60 is set to "500", and the total number of wave detection processors 61001, 61002, 61003, . . . , 61500 is set to "500" in accordance with the number of sweeps (that is, the length of a code array). Each output signal of the wave detection processors 61001, 61002, 61003 . . . , 61500 branches into a number of signals corresponding to the number of transmitting antennas 41 to 44 (=4).

The demodulator 62 includes a plurality of demodulation processors 621 to 624 that demodulates the output signals of the wave detection processors 61001 to 61500 by performing opposite phase modulation of the output signals using a plurality of codes, of the codes includes in the plurality of code arrays (the first code array to the fourth code array), in a corresponding temporal position. The plurality of demodulation processors 621 to 624 is disposed in correspondence with each of the plurality of wave detection processors 61001 to 61500 with the demodulation processors 621 to 624 as one set.

In the embodiment, the demodulation processor 621 performs phase modulation that is opposite to the phase modulation performed in the modulator 30 for the transmitted signal transmitted from the transmitting antenna 41. That is, the demodulation processor 621 performs phase modulation by using a code array configured of codes (hereinafter, referred to as opposite codes) that are opposite to the codes constituting the code array applied in the modulator 30 to the transmitted signal transmitted from the transmitting antenna 42.

If one code constituting the code array applied to the transmitted signal transmitted from the transmitting antenna 41 is, for example, "π", the opposite code thereof is "-π". The opposite code "-π" means that the phase is rotated by π in a direction opposite to the direction at the time of transmission. That is, phase modulation that uses the opposite code means that the phase of a signal is returned to the original phase before phase modulation. If the code is "0", the amount of phase rotation by the opposite code thereof is zero. Thus, the phase is not rotated.

Similarly, the demodulation processor 622 performs phase modulation that is opposite to the phase modulation performed in the modulator 30 for the transmitted signal transmitted from the transmitting antenna 42. The demodulation processor 623 performs phase modulation that is opposite to the phase modulation performed in the modulator 30 for the transmitted signal transmitted from the transmitting antenna 43. The demodulation processor 624 performs phase modulation that is opposite to the phase modulation performed in the modulator 30 for the transmitted signal transmitted from the transmitting antenna 44.

The integrator 63 includes a plurality of integration processors 631 to 634 that corresponds to the plurality of transmitting antennas 41 to 44. Each of the plurality of integration processors 631 to 634 is configured to integrate a signal, of the demodulation processors 621 to 624 disposed in each of the plurality of wave detection processors 61001 to 61500, having a phase thereof oppositely modulated by using opposite codes that correspond to codes belonging to the same code array. Specifically, the demodulation processor 621 integrates the output signals of 500 demodulation processors 621 having phases thereof oppositely modulated by using the opposite codes of the codes constituting the first code array corresponding to the transmitting antenna 41. The integration result is output as the received signal Rx11 from the integration processor 631.

The demodulation processor 622 integrates the output signals of 500 demodulation processors 622 having phases thereof oppositely modulated by using the opposite codes of the codes constituting the second code array corresponding to the transmitting antenna 42. The integration result is output as the received signal Rx12 from the integration processor 632. The demodulation processor 623 integrates the output signals of 500 demodulation processors 623 having phases thereof oppositely modulated by using the opposite codes of the codes constituting the third code array corresponding to the transmitting antenna 43. The integration result is output as the received signal Rx13 from the integration processor 633.

The demodulation processor 624 integrates the output signals of 500 demodulation processors 624 having phases thereof oppositely modulated by using the opposite codes of the codes constituting the fourth code array corresponding to the transmitting antenna 44. The integration result is output as the received signal Rx14 from the integration processor 634.

As described later, the received signals Rx11 to Rx14 are orthogonal separated signals and are received signals that are acquired by distinguishing individual signals transmitted from the transmitting antennas 41 to 44.

The received signals Rx11, Rx12, Rx13, and Rx14 that are respectively output from the integration processors 631 to 634 are supplied as the received signal Rx1 to the signal processor 70 from the receiver 60 disposed in correspondence with the receiving antenna 51. Similarly, the received signals Rx2 to Rx6 are supplied to the signal processor 70 from the receivers 60 respectively disposed in correspondence with the other receiving antennas 52 to 56.

The signal processor 70 is used to generate information related to an azimuth angle θ of a target by performing a beamforming process in which the signals integrated by the integrators 63 of the receivers 60 disposed in correspondence with the receiving antennas 51 to 56 are combined for each transmitting antenna.

[Description of Operation of Radar Device]

Next, operation of the radar device 1 according to the embodiment of the invention will be described.

First, a transmitting operation of the radar device 1 will be described. As shown in the upper part of FIG. 2, the signal generator 10 repeatedly generates, in a certain cycle as the transmitted signals Tx1 to Tx4, an FMCW wave of which the frequency f rises straight from a predetermined lower limit value to a predetermined upper limit value. The transmitted signals Tx1 to Tx4 are the same signals at the time of being generated by the signal generator 10.

The code generator 20 generates the first code array, the second code array, the third code array, and the fourth code array that correspond to the transmitting antennas 41 to 44. In the embodiment, as described above, the code generator 20 generates "ππππ0ππ0π . . . 0π0π" as the first code array, generates "0ππ0ππ000 . . . π0π0" as the second code array, generates "0π000π000 . . . 0π0π" as the third code array, and generates "π0π0ππ0ππ . . . 0πππ" as the fourth code array.

Next, the modulator 30 performs a code modulation process (phase modulation) for the transmitted signal generated by the signal generator 10 by applying the code array generated by the code generator 20. Specifically, the modulator 30 corresponding to the transmitting antenna 41 modulates the phase of the transmitted signal Tx1 generated by the signal generator 10 by applying the first code array generated by the code generator 20. Specifically, as shown in the upper part of FIG. 2, the modulator 30 rotates the phase of a signal in a first sweep S1001 of the transmitted signal Tx by the amount of phase rotation (+180°) indicated by the value "π" of the first code of the first code array. This phase modulation inverts the phase of the transmitted signal Tx1 in the first sweep S1001.

The modulator 30 rotates the phase of a signal in a second sweep S1002 of the transmitted signal Tx1 by the amount of phase rotation (+180°) indicated by the value "π" of the second code of the first code array. Similarly, the modulator 30 performs phase modulation by applying the values of the codes of the first code array in order and rotates the phase of a signal in a 500th sweep S1500 of the transmitted signal Tx1 by the amount of phase rotation (+180°) indicated by the value "π" of the 500th code of the first code array.

In this example, for example, the phase of a signal in a fifth sweep S1005 of the transmitted signal Tx1 is rotated by the amount of phase rotation (+0°) indicated by the value "0" of the fifth code of the first code array. In this case, phase rotation is not actually performed, and the original phase of the transmitted signal Tx1 in the fifth sweep S1005 is maintained.

Along with the above-described phase modulation of the transmitted signal Tx1, phase modulation of the transmitted signals Tx2 to Tx4 generated by the signal generator 10 is performed for each sweep by applying each of the second code array to the fourth code array generated by the code generator 20 in the modulators 30 disposed in correspondence with the transmitting antennas 42 to 44. That is, the modulator 30 corresponding to the transmitting antenna 42 modulates the phase of sweeps S2001 to S2500 of the transmitted signal Tx2 generated by the signal generator 10 by applying the second code array generated by the code generator 20.

The modulator 30 corresponding to the transmitting antenna 43 modulates the phase of sweeps S3001 to S3500 of the transmitted signal Tx3 generated by the signal generator 10 by applying the third code array generated by the code generator 20. The modulator 30 corresponding to the transmitting antenna 44 modulates the phase of sweeps S4001 to S4500 of the transmitted signal Tx4 generated by the signal generator 10 by applying the fourth code array generated by the code generator 20.

Signals having phases thereof modulated by the modulators 30 corresponding to the transmitting antennas 41 to 44 are respectively transmitted from the transmitting antennas 41 to 44. When the target is irradiated with the electromagnetic waves of the signals transmitted from the transmitting antenna 41 to 44, reflective waves of the electromagnetic waves are generated. The reflective waves from the target are received in each of the receiving antennas 51 to 56. In this case, for example, the receiving antenna 51 receives the signals transmitted from the transmitting antennas 41 to 44. Similarly, each of the receiving antennas 52 to 56 receives the signals transmitted from the transmitting antennas 41 to 44.

Next, a receiving operation of the radar device 1 will be described.

For convenience of description, description will be provided with focus on operation of the receiver 60 that is disposed in correspondence with the receiving antenna 51.

Figure 3:
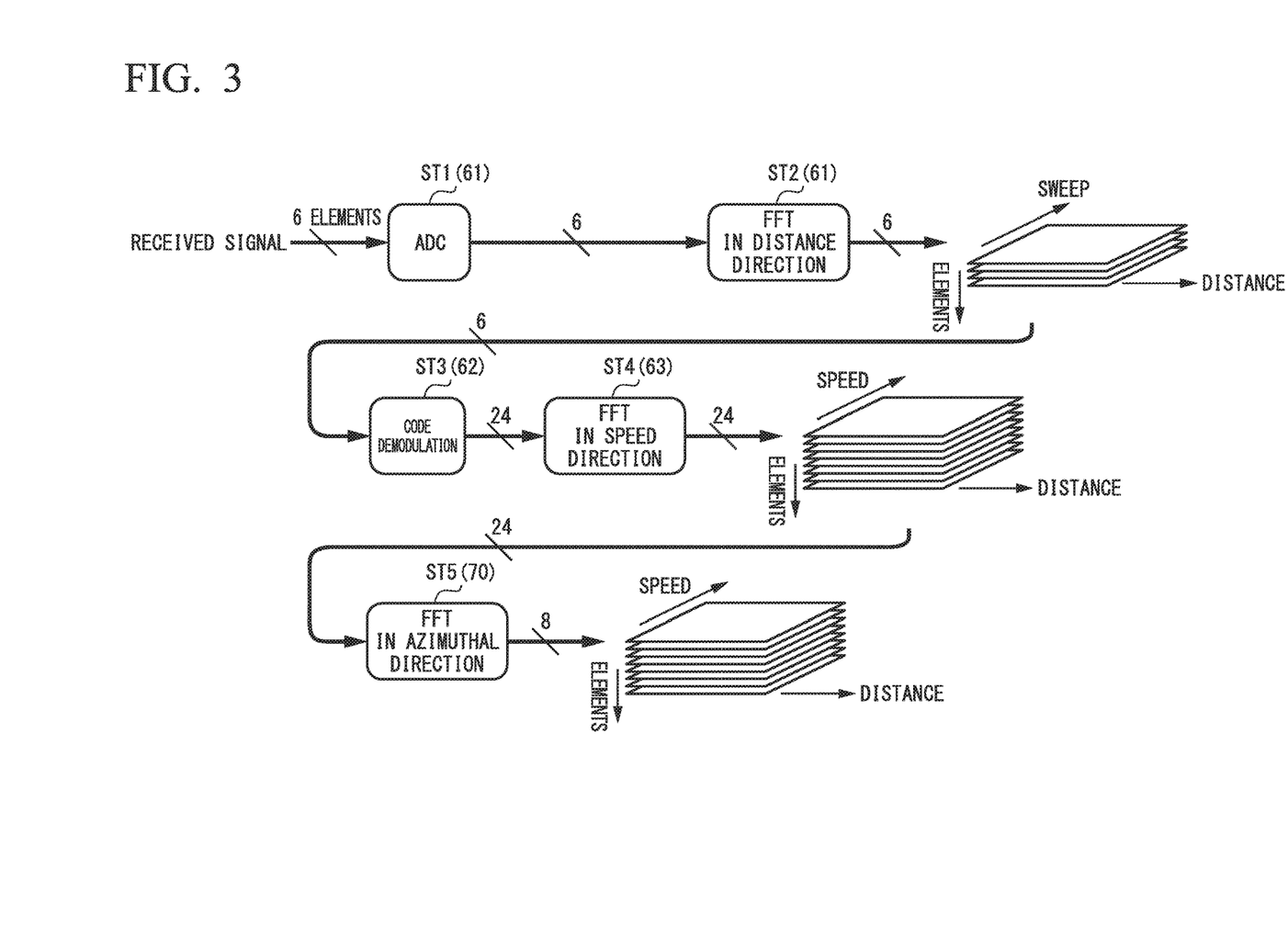
FIG. 3 is a diagram showing a flow of a receiving operation performed by the receiver of the radar device according to the embodiment of the invention.
Figure 4A:
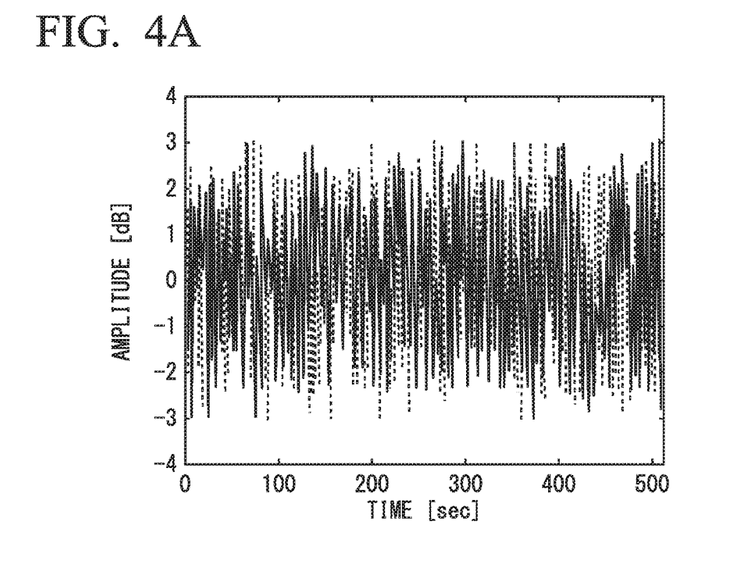
FIG. 4A is a diagram supplementing operation of the radar device according to the embodiment of the invention and is a diagram showing one example of an output waveform of a wave detector.
Figure 4B:
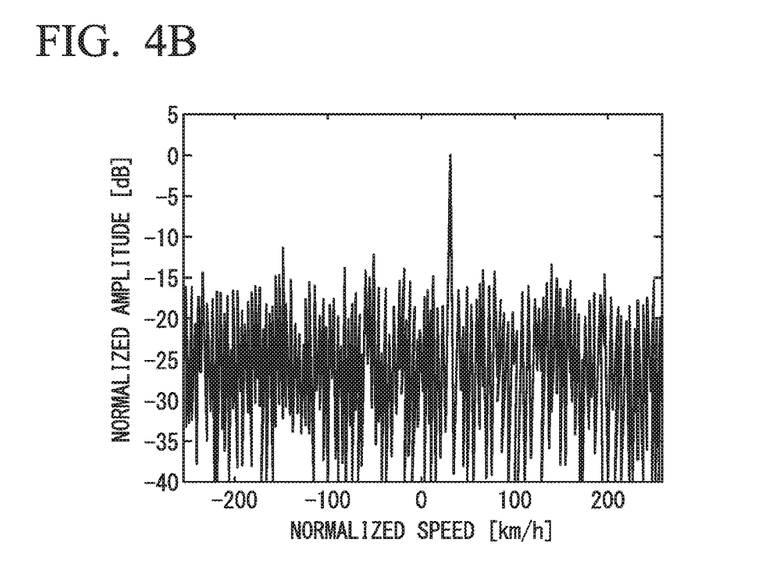
FIG. 4B is a diagram supplementing operation of the radar device according to the embodiment of the invention and is a diagram showing one example of an output waveform of an integrator.
Figure 4C:
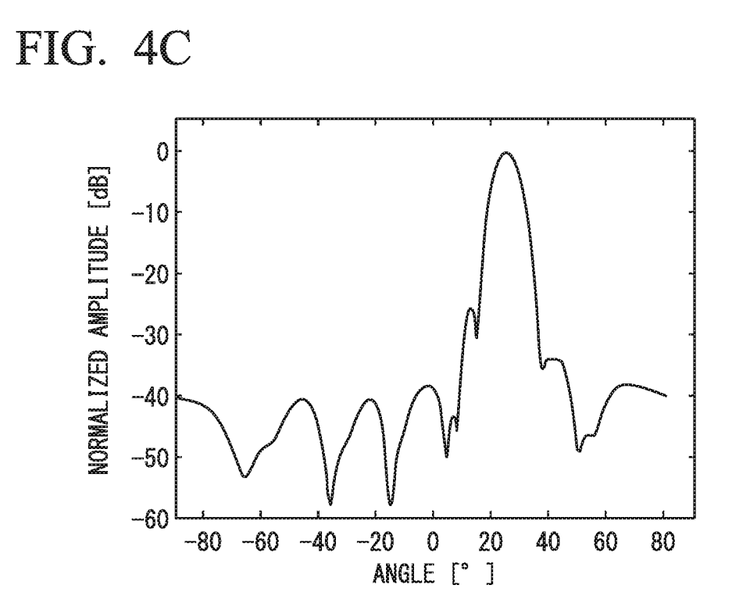
FIG. 4C is a diagram supplementing operation of the radar device according to the embodiment of the invention and is a diagram showing one example of an output waveform of a signal processor.

FIG. 3 is a diagram showing a flow of the receiving operation performed by the receiver 60 of the radar device 1 according to the embodiment of the invention. FIGS. 4A to 4C are diagrams supplementing the operation of the radar device 1 according to the embodiment of the invention. FIG. 4A shows one example of an output waveform of the wave detector 61. FIG. 4B shows one example of an output waveform of the integrator 63. FIG. 4C shows one example of an output waveform of the signal processor 70.

Each of the receiving antennas 51 to 56 on the reception side receives a signal that is a linear combination of the transmitted signals transmitted from all of the transmitting antennas 41 to 44. The wave detector 61 constituting the receiver 60 corresponding to the receiving antenna 51 performs analog/digital conversion of the received signal received by the receiving antenna 51 (Step ST1). In the same manner, the wave detectors 61 constituting the receivers 60 corresponding to the other receiving antennas 52 to 56 perform analog/digital conversion of the received signals respectively received by the receiving antennas 52 to 56. Therefore, analog/digital conversion of the received signals respectively received by the six receiving antennas 51 to 56 is performed in the wave detector 61.

Next, the wave detector 61 corresponding to the receiving antenna 51 performs a "Fourier transform" (may be a fast Fourier transform (FFT) in the case of requiring high speed) in a frequency direction of the received signal that is received by the receiving antenna 51 and has an interfering component thereof removed (Step ST2). Specifically, the wave detection processor 61001 constituting the wave detector 61 performs a Fourier transform in the frequency direction of a mixed signal that is acquired by the receiving antenna 51 receiving first sweeps S1001, S2001, S3001, and S4001 of the transmitted signals Tx1 to Tx4.

The wave detection processor 61002 performs a Fourier transform in the frequency direction of a mixed signal that is acquired by the receiving antenna 51 receiving second sweeps S1002, S2002, S3002, and S4002 of the transmitted signals Tx1 to Tx4. The same applies for the subsequent wave detection processors. The wave detection processor 61500 performs a Fourier transform in the frequency direction of a mixed signal that is acquired by the receiving antenna 51 receiving 500th sweeps S1500, S2500, S3500, and S4500 of the transmitted signals Tx1 to Tx4. By this Fourier transform, the wave detector 61 extracts the distance of the target. Signal components of the transmitted signals Tx1 to Tx4 that are respectively coded by using the first code array to the fourth code array spread over in the output waveform of the wave detector 61 shown in FIG. 4A.

The wave detector 61 corresponding to the receiving antenna 51 extracts a distance r to the target during the process of the Fourier transform in the frequency direction and generates information related to the distance r. In the same manner, the wave detectors 61 corresponding to the receiving antennas 52 to 56 perform a Fourier transform in the frequency direction of a signal having an interfering component thereof removed. Therefore, a Fourier transform in the frequency direction is performed of the received signal received by each of the six receiving antennas 51 to 56 in the wave detector 61 that is disposed in correspondence with each of the receiving antennas 51 to 56. A signal that is acquired by a Fourier transform in the wave detector 61 disposed in correspondence with each of the receiving antennas 51 to 56 is a mixed signal that includes each signal component of the transmitted signals Tx1 to Tx4 respectively transmitted by the transmitting antennas 41 to 44.

Next, the demodulator 62 performs a code demodulation process (decoding process) of the mixed signal output from each of the wave detection processors 61001 to 61500 of the wave detector 61 (Step ST3). That is, the demodulation processor 621 of the demodulator 62 disposed in correspondence with the wave detection processor 61001 performs opposite phase modulation, an opposite process to the phase modulation performed in the modulator 30 on the transmission side for the first sweep of the transmitted signal Tx1, of the mixed signal output from the wave detection processor 61001. Specifically, the demodulation processor 621 rotates the phase of the signal output from the wave detection processor 61001 by −180° by using the opposite code corresponding to the first code of the first code array.

The demodulation processor 622 of the demodulator 62 disposed in correspondence with the wave detection processor 61001 performs opposite phase modulation, an opposite process to the phase modulation performed by the modulator 30 on the transmission side for the first sweep of the transmitted signal Tx2, of the mixed signal output from the wave detection processor 61001. Specifically, the demodulation processor 622 rotates the phase of the signal output from the wave detection processor 61001 by −0° by using the opposite code corresponding to the first code of the second code array. In this case, phase rotation is not actually performed, and the original phase is maintained.

The demodulation processor 623 of the demodulator 62 disposed in correspondence with the wave detection processor 61001 performs opposite phase modulation, an opposite process to the phase modulation performed by the modulator 30 on the transmission side for the first sweep of the transmitted signal Tx3, of the mixed signal output from the wave detection processor 61001. Specifically, the demodulation processor 623 rotates the phase of the signal output from the wave detection processor 61001 by −0° by using the opposite code corresponding to the first code of the third code array. Even in this case, phase rotation is not actually performed, and the original phase is maintained.

The demodulation processor 624 of the demodulator 62 disposed in correspondence with the wave detection processor 61001 performs opposite phase modulation, which corresponds to an opposite process to the phase modulation performed by the modulator 30 on the transmission side for the first sweep of the transmitted signal Tx4, of the mixed signal output from the wave detection processor 61001. Specifically, the demodulation processor 624 rotates the phase of the signal output from the wave detection processor 61001 by −180° in the opposite direction to the phase modulation on the transmission side by using the opposite code corresponding to the first code of the fourth code array.

In the demodulation processors 621 to 624 disposed in correspondence with the wave detection processor 61001, the phase of the mixed signal output from the wave detection processor 61001 is oppositely modulated by using the opposite code corresponding to each first code of the first code array, the second code array, the third code array, and the fourth code array.

The demodulation processor 621 of the demodulator 62 disposed in correspondence with the wave detection processor 61002 performs opposite phase modulation, an opposite process to the phase modulation performed in the modulator 30 on the transmission side for the second sweep of the transmitted signal Tx1, of the mixed signal output from the wave detection processor 61002. Specifically, the demodulation processor 621 rotates the phase of the signal output from the wave detection processor 61002 by −180° by using the opposite code corresponding to the second code of the first code array.

The demodulation processor 622 of the demodulator 62 disposed in correspondence with the wave detection processor 61002 performs opposite phase modulation, an opposite process to the phase modulation performed in the modulator 30 on the transmission side for the second sweep of the transmitted signal Tx2, of the mixed signal output from the wave detection processor 61002. Specifically, the demodulation processor 622 rotates the phase of the signal output from the wave detection processor 61002 by −180° by using the opposite code corresponding to the second code of the second code array.

The demodulation processor 623 of the demodulator 62 disposed in correspondence with the wave detection processor 61002 performs opposite phase modulation, an opposite process to the phase modulation performed in the modulator 30 on the transmission side for the second sweep of the transmitted signal Tx3, of the mixed signal output from the wave detection processor 61002. Specifically, the demodulation processor 623 rotates the phase of the signal output from the wave detection processor 61002 by −180° by using the opposite code corresponding to the second code of the third code array.

The demodulation processor 624 of the demodulator 62 disposed in correspondence with the wave detection processor 61002 performs opposite phase modulation, an opposite process to the phase modulation performed in the modulator 30 on the transmission side for the second sweep of the transmitted signal Tx4, of the mixed signal output from the wave detection processor 61002. Specifically, the demodulation processor 624 rotates the phase of the signal output from the wave detection processor 61001 by −0° in the opposite direction to the phase modulation on the transmission side by using the opposite code corresponding to the second code of the fourth code array. In this case, the original phase of the mixed signal is maintained.

In the demodulation processors 621 to 624 disposed in correspondence with the wave detection processor 61002, the phase of the mixed signal output from the wave detection processor 61002 is oppositely modulated by using the opposite code corresponding to each second code of the first code array, the second code array, the third code array, and the fourth code array.

The demodulation processor 621 of the demodulator 62 disposed in correspondence with the wave detection processor 61003 performs opposite phase modulation, an opposite process to the phase modulation performed in the modulator 30 on the transmission side for the third sweep of the transmitted signal Tx1, of the mixed signal output from the wave detection processor 61003. Specifically, the demodulation processor 621 rotates the phase of the signal output from the wave detection processor 61003 by −180° by using the opposite code corresponding to the third code of the first code array.

The demodulation processor 622 of the demodulator 62 disposed in correspondence with the wave detection processor 61003 performs opposite phase modulation, an opposite process to the phase modulation performed in the modulator 30 on the transmission side for the third sweep of the transmitted signal Tx2, of the mixed signal output from the wave detection processor 61003. Specifically, the demodulation processor 622 rotates the phase of the signal output from the wave detection processor 61003 by −180° by using the opposite code corresponding to the third code of the second code array.

The demodulation processor 623 of the demodulator 62 disposed in correspondence with the wave detection processor 61003 performs opposite phase modulation, an opposite process to the phase modulation performed in the modulator 30 on the transmission side for the third sweep of the transmitted signal Tx3, of the mixed signal output from the wave detection processor 61003. Specifically, the demodulation processor 623 rotates the phase of the signal output from the wave detection processor 61003 by −0° by using the opposite code corresponding to the third code of the third code array. In this case, the original phase of the mixed signal is maintained.

The demodulation processor 624 of the demodulator 62 disposed in correspondence with the wave detection processor 61003 performs opposite phase modulation, an opposite process to the phase modulation performed in the modulator 30 on the transmission side for the third sweep of the transmitted signal Tx4, of the mixed signal output from the wave detection processor 61003. Specifically, the demodulation processor 624 rotates the phase of the signal output from the wave detection processor 61003 by −180° in the opposite direction to the phase modulation on the transmission side by using the opposite code corresponding to the third code of the fourth code array.

In the demodulation processors 621 to 624 disposed in correspondence with the wave detection processor 61003, the phase of the mixed signal output from the wave detection processor 61003 is oppositely modulated by using the opposite code corresponding to each third code of the first code array, the second code array, the third code array, and the fourth code array.

The same applies for the subsequent wave detection processors. In the demodulation processors 621 to 624 disposed in correspondence with the wave detection processor 61500, the phase of the mixed signal output from the wave detection processor 61500 is oppositely modulated by using the opposite code corresponding to each 500th code of the first code array, the second code array, the third code array, and the fourth code array.

As described above, the demodulator 62 performs a code demodulation process (decoding process) of the mixed signal output from the wave detector 61 by switching the opposite code for each sweep.

The code demodulation process performed by the demodulator 62 may be performed in any step before an integration process performed by the integrator 63 described later.

Next, the integrator 63 integrates the output signals of the demodulation processors 621 to 624 disposed in correspondence with each of the wave detection processors 61001 to 61500 by performing a Fourier transform in a time direction of the signal demodulated by the demodulator 62 (Step ST4). As a result of this integration, signal components of the transmitted signals transmitted from the corresponding transmitting antenna are distinguished and acquired.

Such integration may be realized in any of the following forms.

(1) Arithmetic addition that is performed with phase information.

(2) Coherent integration in which a Doppler phase with respect to the moving speed of the target is corrected.

The coherent integration may be performed in any of the following forms. During the coherent integration, interference with different Doppler components may be dealt with by multiplying each component by a weight from a window function or the like.

(a) Correct a Doppler phase that indicates a known speed of the target.

(b) Correct a Doppler phase that indicates any assumed speed.

By such a process, the integrator 63 extracts a speed v of the target and generates information related to the speed v.

Specifically, the integration processor 631 constituting the integrator 63 integrates each output signal of the demodulation processors 621 that are respectively disposed in correspondence with the wave detection processors 61001 to 61500. The integration processor 631 outputs the received signal Rx11 that indicates a calculation result $F_{00}(v, r)$ of the integration. The signal component of the transmitted signal Tx1, of the signal components of the transmitted signals Tx1 to Tx4, is distinguished and included in the output waveform of the integration processor 631 shown in FIG. 4B.

The integration processor 632 constituting the integrator 63 integrates each output signal of the demodulation processors 622 that are respectively disposed in correspondence with the wave detection processors 61001 to 61500. The integration processor 632 outputs the received signal Rx12 that indicates a calculation result $F_{10}(v, r)$ of the integration. The integration processor 633 constituting the integrator 63 integrates each output signal of the demodulation processors 623 that are respectively disposed in correspondence with the wave detection processors 61001 to 61500. The integration processor 633 outputs the received signal Rx13 that indicates a calculation result $F_{20}(v, r)$ of the integration. The integration processor 634 constituting the integrator 63 integrates each output signal of the demodulation processors 624 that are respectively disposed in correspondence with the wave detection processors 61001 to 61500. The integration processor 634 outputs the received signal Rx14 that indicates a calculation result $F_{30}(v, r)$ of the integration.

Each of the calculation results $F_{00}(v, r)$ to $F_{30}(v, r)$ from the Fourier transform in the time direction includes, as reception information corresponding to the receiving antenna 51, the information related to the speed v of the target and the information related to the distance r to the target.

The same reception process as the receiver 60 disposed in correspondence with the receiving antenna 51 is performed in the receivers 60 that are disposed in correspondence with the other receiving antennas 52 to 56. The received signals Rx1 to Rx6 are supplied to the signal processor 70 from the receivers 60 disposed in correspondence with the receiving antennas 51 to 56.

As described above, during the reception process in the receiver 60, the demodulation processors 621 to 624 perform opposite phase modulation, an opposite process to the phase modulation on the transmission side, in a step before the integration process (Doppler process) of the integrator 63 for 500 sweeps of the mixed signal acquired by detecting the waves of the transmitted signals Tx1 to Tx4. At this point, with focus on the output of the 500 demodulation processors 621 disposed in correspondence with the wave detection processors 61001 to 61500, phase modulation that is opposite to the phase modulation performed by the modulator 30 on the transmission side using the first code array is performed of the mixed signal output from each of the wave detection processors 61001 to 61500. Consequently, the probability of the signal component of the transmitted signal Tx1 appearing in the output signal of the demodulation processor 621 is increased.

On the other hand, when modulation that is opposite to the phase modulation using the first code array is performed in the demodulation processor 621 for each signal component of the transmitted signals Tx2, Tx3, and Tx4 having phases thereof modulated on the transmission side by using the second code array, the third code array, and the fourth code array that are different from the first code array, each signal component of the transmitted signals Tx2 to Tx4 is dispersed to be a noise, and the probability of the signal component appearing in the output signal of the demodulation processor 621 is decreased.

Therefore, if the output signals of the 500 demodulation processors 621 disposed in correspondence with the wave detection processors 61001 to 61500 are integrated in the integration processor 631, the signal component of the transmitted signal Tx1 can be distinguished from the mixed signals output from the wave detection processors 61001 to 61500. This means that orthogonal separation of the transmitted signal Tx1 is performed in the integration process of the integration processor 631.

Similarly, if phase modulation that is opposite to the phase modulation using the second code array is performed in the demodulation processor 622 for the mixed signals respectively output from the wave detection processors 61001 to 61500, the probability of the signal component of the transmitted signal Tx2 appearing in the output signal of the demodulation processor 622 is increased. Therefore, if the output signals of the 500 demodulation processors 622 disposed in correspondence with the wave detection processors 61001 to 61500 are integrated in the integration processor 632, the signal component of the transmitted signal Tx2 can be distinguished from the mixed signals output from the wave detection processors 61001 to 61500. This means that orthogonal separation of the transmitted signal Tx2 is performed in the integration process of the integration processor 632.

Similarly, if phase modulation that is opposite to the phase modulation using the third code array is performed in the demodulation processor 623 for the mixed signals respectively output from the wave detection processors 61001 to 61500, the probability of the signal component of the transmitted signal Tx3 appearing in the output signal of the demodulation processor 623 is increased. Therefore, if the output signals of the 500 demodulation processors 623 disposed in correspondence with the wave detection processors 61001 to 61500 are integrated in the integration processor 633 the signal component of the transmitted signal Tx3 can be distinguished from the mixed signals output from the wave detection processors 61001 to 61500. This means that orthogonal separation of the transmitted signal Tx3 is performed in the integration process of the integration processor 633.

Similarly, if phase modulation that is opposite to the phase modulation using the fourth code array is performed in the demodulation processor 624 for the mixed signals respectively output from the wave detection processors 61001 to 61500, the probability of the signal component of the transmitted signal Tx4 appearing in the output signal of the demodulation processor 624 is increased. Therefore, if the output signals of the 500 demodulation processors 624 disposed in correspondence with the wave detection processors 61001 to 61500 are integrated in the integration processor 634, the signal component of the transmitted signal Tx4 can be distinguished from the mixed signals output from the wave detection processors 61001 to 61500. This means that orthogonal separation of the transmitted signal Tx4 is performed in the integration process of the integration processor 634.

The signal processor 70 extracts the azimuth angle θ of the target from the received signals Rx1 to Rx4 output by the integrators 63 of the receivers 60 disposed in correspondence with the receiving antennas 51 to 56 and generates information related to the azimuth angle θ (Step ST5). In the embodiment, the signal processor 70 extracts the azimuth angle θ of the target and generates the information related to the azimuth angle θ by performing a predetermined beamforming process for the received signals Rx1 to Rx6 output from the integrators 63.

As shown in FIG. 4C, a waveform that includes a main loop indicating the azimuth angle θ of the target is acquired by the beamforming process in the signal processor 70.

The signal processor 70 outputs, as a calculation result F(v, r, θ) of the beamforming process, the information related to the speed v of the target, the information related to the distance r to the target, and the information related to the azimuth angle θ of the target.

As described above, the receiver 60 does not perform orthogonal separation of a signal in the step of the wave detector 61 extracting the distance. The receiver 60 performs orthogonal separation in the step of the integrator 63 extracting the speed, after the phase of the signal is returned to the original phase by the demodulator 62 performing opposite phase modulation. Accordingly, a MIMO virtual array is formed.

FIGS. 5A to 5F are diagrams showing simulation results of the operation of the radar device 1 according to the embodiment of the invention. In this simulation, the first code array to the fourth code array are generated by using M-sequences, and a speed measurement range is set to ±53 km/h.

Figure 5A:
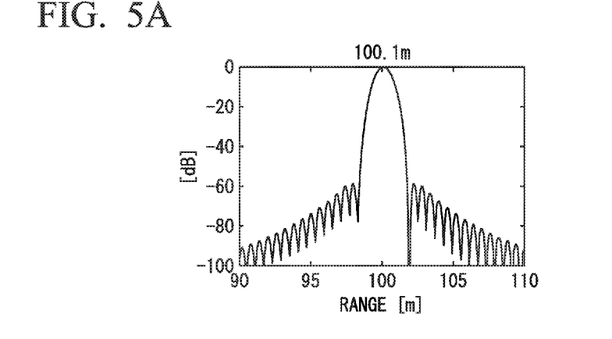
FIG. 5A is a diagram showing a simulation result of operation of the radar device according to the embodiment of the invention and showing a simulation result when, as conditions of the simulation, the distance of a target is set to 100 m, the speed of the target is set to −10 km/h (means a speed of approach) in a speed measurement range, the azimuth angle of the target is set to 30° (means the target is positioned left), and the speed measurement range is set to ±53 km/h.
Figure 5B:
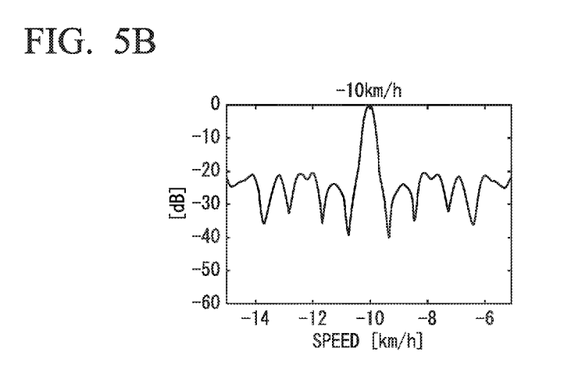
FIG. 5B is a diagram showing a simulation result of operation of the radar device according to the embodiment of the invention and showing a simulation result when, as conditions of the simulation, the distance of a target is set to 100 m, the speed of the target is set to −10 km/h (means a speed of approach) in a speed measurement range, the azimuth angle of the target is set to 30° (means the target is positioned left), and the speed measurement range is set to ±53 km/h.
Figure 5C:
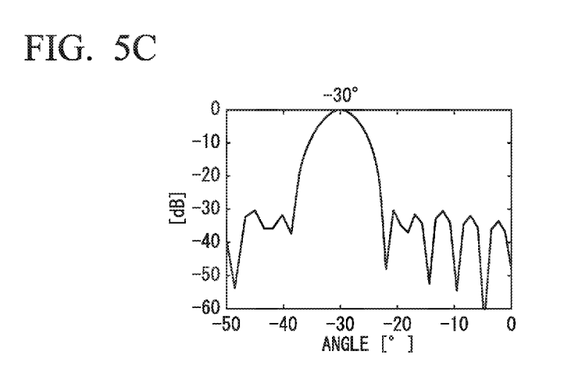
FIG. 5C is a diagram showing a simulation result of operation of the radar device according to the embodiment of the invention and showing a simulation result when; as conditions of the simulation, the distance of a target is set to 100 m, the speed of the target is set to −10 km/h (means a speed of approach) in a speed measurement range; the azimuth angle of the target is set to 30° (means the target is positioned left), and the speed measurement range is set to ±53 km/h.

FIGS. 5A to 5C show simulation results when, as conditions of the simulation, the distance of the target is set to 100 m, the speed of the target is set to −10 km/h within the speed measurement range, and the azimuth angle of the target is set to −30°. FIG. 5A shows a simulation result for the distance of the target. FIG. 5B shows a simulation result for the speed of the target. FIG. 5C shows a simulation result for the azimuth angle of the target.

As shown in FIG. 5A, the distance r to the target is acquired as 100.1 m by simulation. As shown in FIG. 5B, the speed v of the target is acquired as −10 km/h by simulation. As shown in FIG. 5C, the azimuth angle θ of the target is acquired as −30° by simulation. As understood from the simulation results, it can be confirmed that the distance r, the speed v, and the azimuth angle θ of the target can be favorably measured. This means that orthogonal separation of the transmitted signals Tx1 to Tx4 can be performed by the coding process and the decoding process using the first code array to the fourth code array.

Figure 5D:
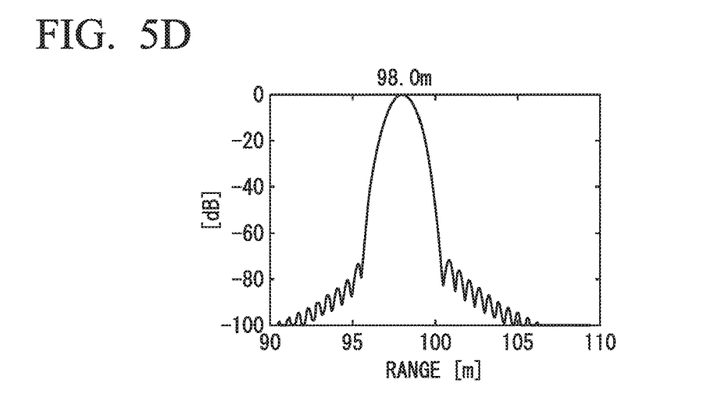
FIG. 5D is a diagram showing a simulation result of operation of the radar device according to the embodiment of the invention and showing a simulation result when; as conditions of the simulation, the distance of a target is set to 100 m, the speed of the target is set to 200 km/h beyond the speed measurement range, and the azimuth angle of the target is set to −30°.
Figure 5E:
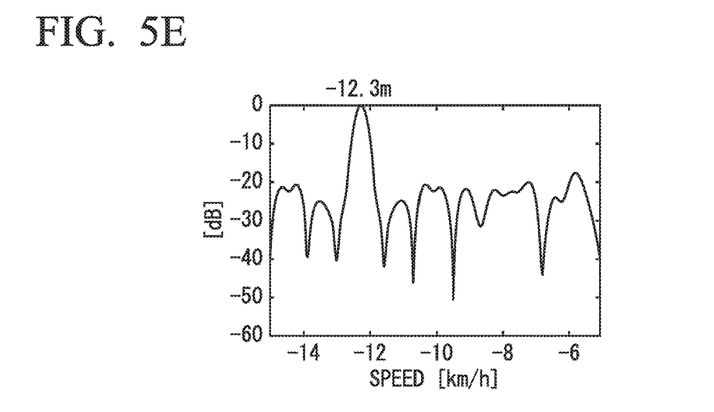
FIG. 5E is a diagram showing a simulation result of operation of the radar device according to the embodiment of the invention and showing a simulation result when; as conditions of the simulation, the distance of a target is set to 100 m, the speed of the target is set to 200 km/h beyond the speed measurement range, and the azimuth angle of the target is set to −30°.
Figure 5F:
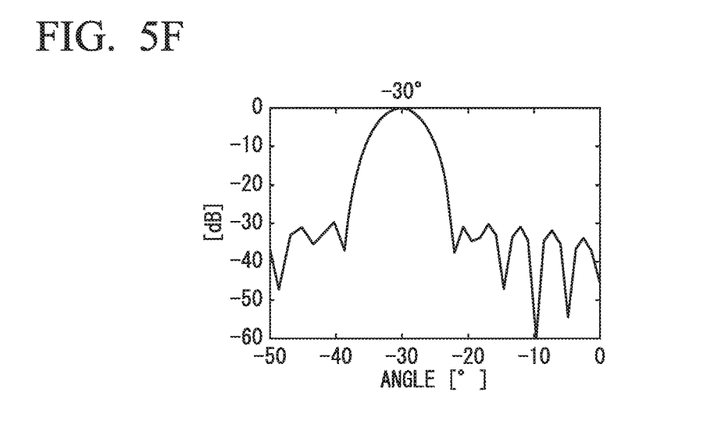
FIG. 5F is a diagram showing a simulation result of operation of the radar device according to the embodiment of the invention and showing a simulation result when, as conditions of the simulation, the distance of a target is set to 100 m, the speed of the target is set to 200 km/h beyond the speed measurement range, and the azimuth angle of the target is set to −30°.

FIGS. 5D to 5F show simulation results when, as conditions of the simulation, the distance of the target is set to 100 m, the speed of the target is set to 200 km/h beyond the speed measurement range, and the azimuth angle of the target is set to −30°. FIG. 5D shows a simulation result for the distance r of the target. FIG. 5E shows a simulation result for the speed v of the target. FIG. 5F shows a simulation result for the azimuth angle θ of the target.

As shown in FIG. 5A, the distance r to the target is acquired as 98 m by simulation. As shown in FIG. 5C, the azimuth angle θ of the target is acquired as −30° by simulation. On the other hand, as shown in FIG. 5B the speed v of the target is acquired as −12.3 km/h that is different from the set value (200 km/h). However, it can be confirmed that a virtual array can be formed even with a speed beyond the speed measurement range.

According to the above-described embodiment, each signal component of the transmitted signals Tx1 to Tx4 transmitted at the same time from the transmitting antennas 41 to 44 can be distinguished on the reception side. Thus, the amount of time of sampling the received signals can be decreased. Therefore, the upper limit of a measurable speed is not decreased.

According to the above-described embodiment, 24 types of distinguished received signals can be acquired by receiving the transmitted signals respectively transmitted from the four transmitting antennas 41 to 44 in each of the six receiving antennas 51 to 56. This means that the same antenna performance as in the case of using 24 antennas can be achieved. Therefore, according to the above-described embodiment, the basic performance of an antenna can be improved with reduction of increase in the number of antenna elements. Particularly, resolution of an azimuth angle can be improved.

According to the above-described embodiment, each frequency band of the plurality of transmitted signals Tx1 to Tx4 can be set to the same band. Therefore, a frequency band used can be set to be narrow, and the target can be detected by using the narrow frequency band.

According to the above-described embodiment, phase adjustment is not required to be performed in the receiver 60. Therefore, the process and configuration of the receiver 60 can be simplified.

According to the above-described embodiment, orthogonal separation of a signal can be performed by just switching a code for each sweep. Thus, a process related to orthogonal separation can be realized by software, and addition or change of hardware is not required. Therefore, a hardware configuration can be simplified in small size, and a radar system can be standardized.

According to the above-described embodiment, fast codes are not used. Thus, the band on the reception side can be narrowed. Therefore, an orthogonal separation system that has excellent affinity with a radar device using the FMCW system can be realized.

According to the above-described embodiment, a code does not change in a sweep. Thus, signal distortion due to hardware is not enlarged unlike a coding pulse system. Thus, degradation of a characteristic due to signal distortion can be reduced, and generation of spuriousness can be reduced.

According to the above-described embodiment, a sampling frequency of a few MHz is sufficient in analog/digital conversion in the wave detector 61, compared with the case of distinguishing signals by using a coding pulse system. Thus, the wave detector 61 can be realized by using a low-speed analog/digital converter.

While the above-described embodiment represents the invention as the radar device 1, the invention can also be represented as a signal distinction method used in the radar device 1. In this case, a signal distinction method according to the embodiment of the invention is a signal distinction method used by a radar device including a plurality of transmitting antennas, a signal generator that generates a plurality of transmitted signals respectively transmitted from the plurality of transmitting antennas, a code generator that generates a plurality of different code arrays corresponding to the plurality of transmitting antennas, a modulator that, according to the plurality of code arrays, modulates the phases of the plurality of transmitted signals generated by the signal generator and respectively supplies the plurality of transmitted signals having phases thereof modulated to the plurality of transmitting antennas, a plurality of receiving antennas, and a plurality of receivers that correspond to the plurality of receiving antennas. The signal distinction method includes a wave detection step in which the plurality of receivers detects the waves of received signals received by the corresponding receiving antennas, a demodulation step in which the signals having waves thereof detected in the wave detection step are demodulated by oppositely modulating the phases of the signals according to the plurality of code arrays, and an integration step in which the signals demodulated in the demodulation step are integrated to generate a signal corresponding to the plurality of transmitted signals.

The invention can also be represented as an orthogonal separation device. In this case, an orthogonal separation device of the invention, given that the number of antennas on the transmission side is M (M is any natural number) and that the number of antennas on the reception side is N (N is any natural number), includes a demodulator that performs a demodulation process corresponding to each of the plural number N of antennas for each of a plural number P (=M×N) of pulse waves (R11 to R1M), (RN1 to RNM) which arrives at the plural number N of antennas by transmitting, at the same time from the plural number M of antennas, a plural number M of pulse waves having phases $\phi_1$ to $\phi_M$ set as different arrays of known discrete values and that generates a plural number P of demodulated signals (R'$_{11}$ to R'$_{1M}$), (R'$_{N1}$ to R'$_{NM}$), and includes a phase adjuster that adjusts the difference among the phases of the plural number P of demodulated signals (R'$_{11}$ to R'$_{1M}$), . . . , (R'$_{N1}$ to R'$_{NM}$) according to the arrays of known discrete values and that generates a plural number P of in-phase signals (r11 to r1M), . . . , (rN1 to rNM). The orthogonal separation device of the invention may further include an integrator that integrates each combination of in-phase signals (r11 to rN1), . . . , (r1M to rNM), of the plural number P of in-phase signals (r11 to r1M), . . . , (rN1 to rNM), corresponding to each pulse wave arriving at the plural number N of antennas and that acquires received waves $S_1$ to $S_N$ corresponding to the respective plural number N of antennas.

The invention can also be represented as an orthogonal separation method. In this case, an orthogonal separation method of the invention includes performing a demodulation process corresponding to each of the plural number N of antennas for each of the plural number P (=M×N) of pulse waves (R11 to R1M), . . . , (RN1 to RNM) that arrives at the plural number N of antennas by transmitting, at the same time, the plural number M of pulse waves having the phases $\phi_1$ to $\phi_M$ set as different arrays of known discrete values, generating the plural number P of demodulated signals (R'$_{11}$ to R'$_{1M}$), . . . , (R'$_{N1}$ to R'$_{NM}$), adjusting the difference among the phases of the plural number P of demodulated signals (R'$_{11}$ to R'$_{1M}$), . . . , (R'$_{N1}$ to R'$_{NM}$) according to the arrays of known discrete values, and generating the plural number P of in-phase signals (r11 to r1M), . . . , (rN1 to rNM). In the orthogonal separation method, each combination of in-phase signals (r11 to rN1), . . . , (r1M to rNM), of the plural number P of in-phase signals (r11 to r1M, . . . , (rN1 to rNM), corresponding to each pulse wave arriving at the plural number N of antennas may be integrated, and the received waves $S_1$ to $S_N$ corresponding to the respective plural number N of antennas may be acquired.

In the embodiment, the invention is applied to antenna systems of a transmission system and a reception system of an FMCW radar.

However, the invention is not limited to such an FMCW radar and can be applied in the same manner to a pulse radar using a MIMO system or a pulse compression radar in orthogonal separation of a pulse wave that is transmitted and arrives as a reflective wave from the target.

The invention is not limited to such a radar and can be applied to various MIMO wireless transfer systems regardless of types of modulation systems and transfer information to be transferred by a pulse wave if a transmitted wave and a received wave are pulse waves and the phases thereof are set as known discrete values different for each transmitting antenna.

In such a case, a process that is to be performed by the wave detector 61 (the wave detection processors 61001, 61002, 61003 . . . , 61500) has to be replaced by a demodulation process that is suitable for a radar, a modulation system of a MIMO transfer system, or a multiple access system to which the invention is applied.

In the embodiment, the integrator 63 (the integration processors 631 to 634) may not be included in the case of performing, for example, only the following processes after the phase of a signal is returned to the original phase before phase modulation (the phase of a signal is adjusted) by the demodulator 62 (the demodulation processors 621 to 624) as described above.

(1) A process of extracting or identifying a desired signal according to correlation testing.
(2) Beamforming that is performed by appropriately combining only a part of MIMO transfer paths.

While the embodiment of the invention is described heretofore, the invention is not limited to the above-described embodiment. Modification, addition, replacement, and the like can be made to the extent not departing from the gist of the invention.

DESCRIPTION OF REFERENCE NUMERAL

1 RADAR DEVICE
10 SIGNAL GENERATOR
20 CODE GENERATOR
30 MODULATOR
40 TRANSMITTING ANTENNA ARRAY
41 TO 44 TRANSMITTING ANTENNA
50 RECEIVING ANTENNA ARRAY
51 TO 56 RECEIVING ANTENNA
60 RECEIVER
61 WAVE DETECTOR
61001 TO 61004 WAVE DETECTION PROCESSOR (FFT)
62 DEMODULATOR
621 TO 624 DEMODULATION PROCESSOR
63 INTEGRATOR
631 TO 634 INTEGRATION PROCESSOR (FFT)
70 SIGNAL PROCESSOR

The invention claimed is:

1. An orthogonal separation device for processing P (=M×N) pulse waves (R11 to R1M), . . . , (RN1 to RNM) which arrive at N antennas by M pulse waves being transmitted by respective transmitting antennas at the same time, the device comprising:
  a wave detector that performs a wave detection process corresponding to each of the N antennas for each of the P pulse waves (R11 to R1M), . . . , (RN1 to RNM) and that generates P output signals (R'11 to R'1M), . . . , (R'N1 to R'NM), wherein a phase of each of the M pulse waves is modulated based on a value of one code that is included in a code array of known discrete values and the code array is different for each of the transmitting antennas; and
  a demodulator that adjusts difference among the phases of the P output signals (R'11 to R'1M), . . . , (R'N1 to R'NM) according to the code arrays of known discrete values and generates P in-phase signals (r11 to r1M), . . . , (rN1 to rNM).

2. The orthogonal separation device according to claim 1, further comprising:
  an integrator that integrates each combination of the in-phase signals (r11 to rN1), . . . , (r1M to rNM), of the P in-phase signals (r11 to r1M), . . . , (rN1 to rNM), corresponding to each pulse wave arriving at the N antennas and acquires received waves S1 to SN corresponding to the respective N antennas.

3. A multiple-input and multiple-output (MIMO) radar, comprising the orthogonal separation device according to claim 2, wherein the wave detector extracts a distance when the wave detector performs the wave detection process for the pulse waves,
the integrator extracts a speed when the integrator integrates each combination of the in-phase signals, and
the MIMO radar further comprises a signal processor that extracts a azimuth angle based on the received waves.

4. The orthogonal separation device according to claim 1, wherein the adjusting the difference includes performing opposite phase demodulation of each of the P output signals, based on values of codes of the code arrays of known discrete values, in a corresponding temporal position.

5. A multiple-input and multiple-output (MIMO) radar, comprising the orthogonal separation device according to claim 1,
wherein the wave detector extracts a distance when the wave detector performs the wave detection process for the pulse waves.

6. An orthogonal separation method comprising:
performing a wave detection process corresponding to each of N antennas for each of P (=M×N) pulse waves (R11 to R1M), . . . , (RN1 to RNM) and generating P output signals (R'11 to R'1M), . . . , (R'N1 to R'NM), wherein the P pulse waves (R11 to R1M), . . . , (RN1 to RNM) arrive at the N antennas by M pulse waves being transmitted by respective transmitting antennas at the same time, a phase of each of the M pulse waves is modulated based on a value of one code that is included in a code array of known discrete values and the code array is different for each of the transmitting antennas; and
adjusting difference among the phases of the P output signals (R'11 to R'1M), . . . , (R'N1 to R'NM) according to the code arrays of known discrete values and generating P in-phase signals (r11 to r1M), . . . , (rN1 to rNM).

7. The orthogonal separation method according to claim 6, further comprising:
integrating each combination of the in-phase signals (r11 to rN1), . . . , (r1M to rNM), of the P in-phase signals (r11 to r1M), . . . , (rN1 to rNM), corresponding to each pulse wave arriving at the N antennas, and acquiring received waves S1 to SN corresponding to the respective N antennas.

* * * * *